J. H. WAGENHORST.
VEHICLE WHEEL RIM.
APPLICATION FILED JUNE 10, 1912.
1,177,461.
Patented Mar. 28, 1916.
2 SHEETS—SHEET 1.
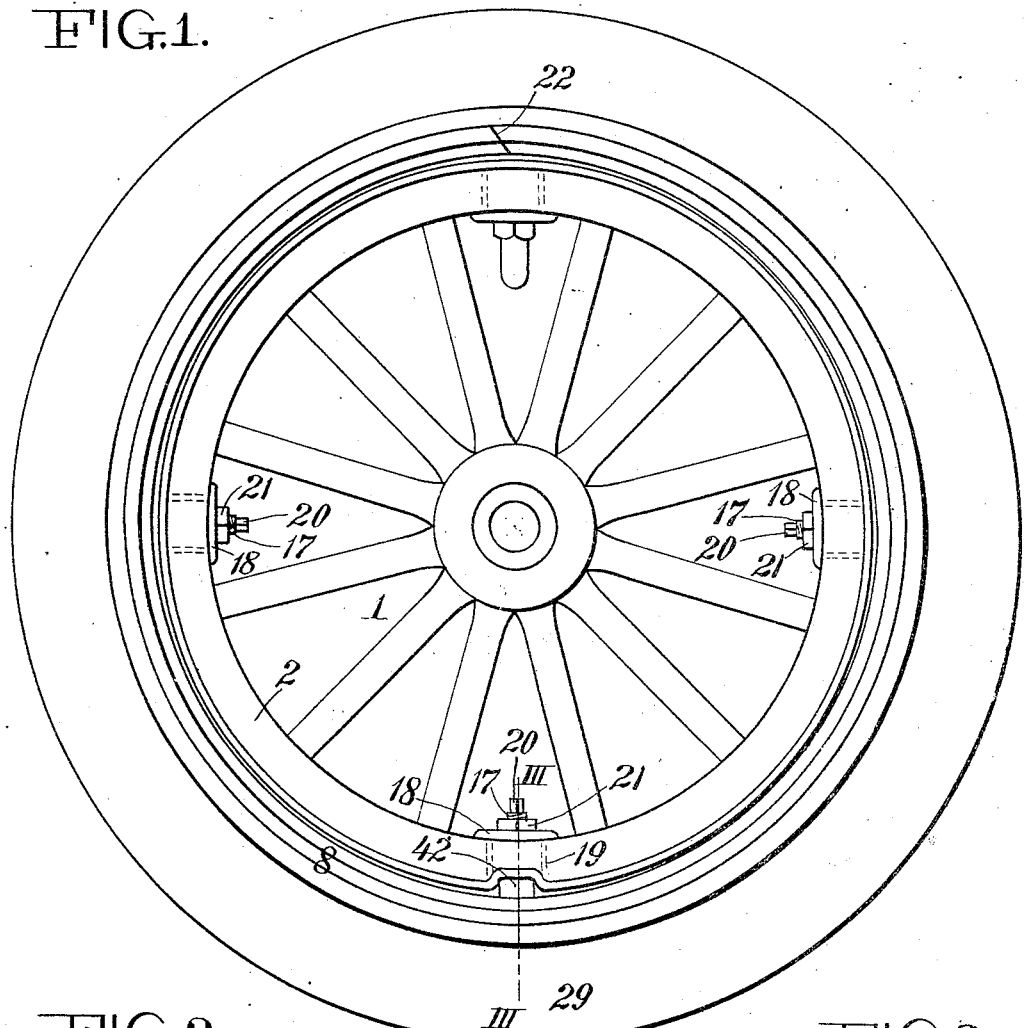
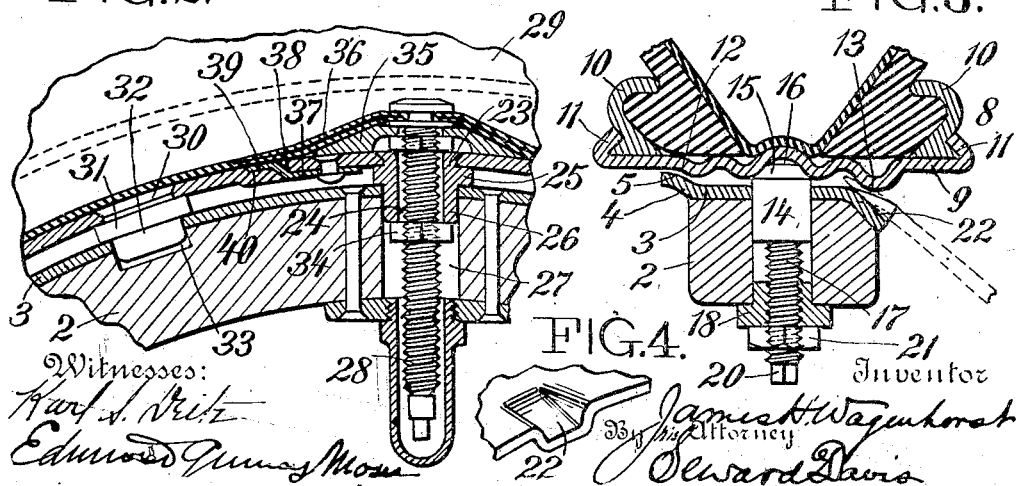

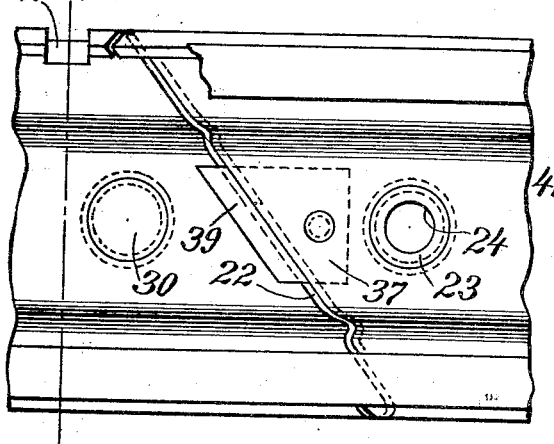
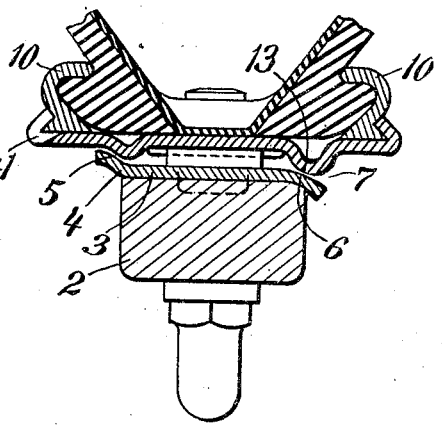
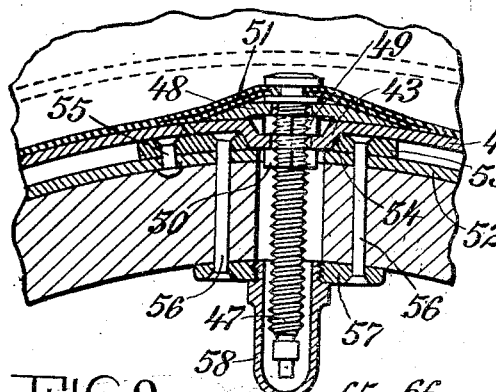
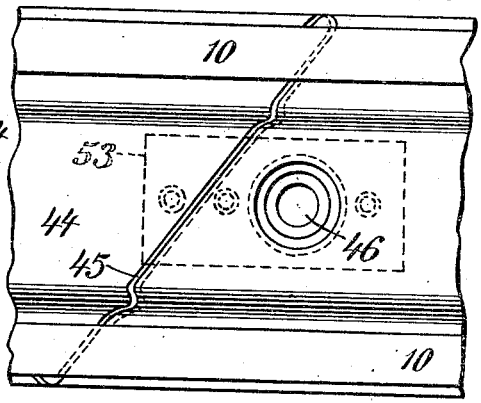
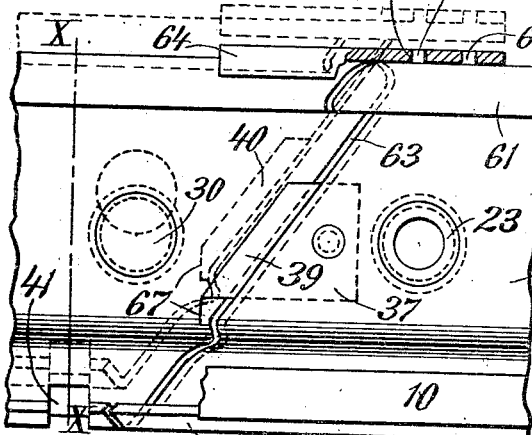
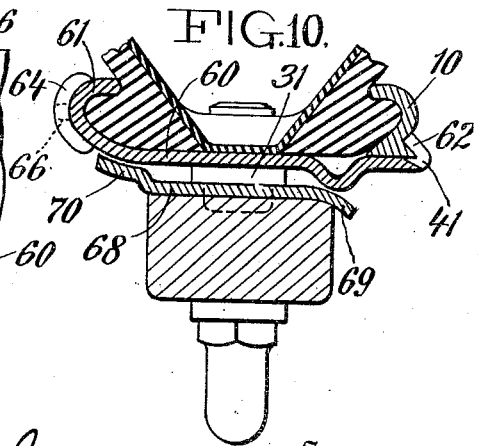

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,177,461.  Specification of Letters Patent.  Patented Mar. 28, 1916.

Application filed June 10, 1912. Serial No. 702,857.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to tire-carrying rims for vehicle wheels.

It contemplates certain improvements in the manner of removably securing a tire-carrying rim upon a wheel, and also certain improvements in the tire-carrying rim.

In certain applications heretofore filed by me I have described and claimed the attaching of a demountable tire-carrying rim to a vehicle wheel by the use of a plurality of radial studs adapted to force the tire-carrying rim away from the periphery of the wheel at intervals and thus cause the rim to grip the wheel between such studs. In accordance with my present invention I use studs to force out portions of the rim, but I have found that it is unnecessary to dispose the studs systematically throughout the circumference of the wheel as the rim may be supported out of contact with the periphery of the wheel by a non-adjustable means at one point, studs being used at other points in the circumference of the wheel to cause the rim to seat upon the non-adjustable means referred to and also upon the periphery of the wheel between such means and the adjacent studs. Such non-adjustable means may also be well adapted to act in place of the driving plate commonly used to prevent creeping of the rim, and may also serve as a protection for the valve-stem. By passing the valve-stem through the rim adjacent to these means, the valve-stem and its adjacent parts may be balanced with the radial studs at the other points in the circumference of the wheel and a symmetrically weighted structure thus obtained.

The nature of my improvements will more fully appear from the following detailed description thereof.

In the accompanying drawings which form a part of this specification, Figure 1 is a side elevation of a vehicle wheel with a rim and tire thereon, the rim embodying one form of my invention; Fig. 2 is a circumferential section on an enlarged scale through a portion of the wheel felly and rim of Fig. 1; Fig. 3 is a transverse section of the wheel felly and rim shown in Fig. 1 taken on line III—III of that figure; Fig. 4 is a fragmentary perspective view of a portion of the felly band showing the depression therein to receive a tool for prying the rim from the wheel; Fig. 5 is a plan view of a portion of the tire-carrying rim of Figs. 1, 2 and 3, showing the transverse split therein; Fig. 6 is a transverse section through the rim and wheel felly, the position of the section being indicated by the line VI—VI in Fig. 5; Fig. 7 is a longitudinal section through a portion of the wheel felly and rim illustrating a modified form of my invention; Fig. 8 is a plan view of a portion of the rim shown in Fig. 7, the plate secured to the wheel felly beneath the rim being shown in dotted lines; Fig. 9 is a plan view of a portion of a tire-carrying rim embodying a modified form of my invention, showing the rim at the point where the same is transversely split and illustrating in dotted lines one end of the rim moved laterally to disengage the interlocking means on the ends of the rim; Fig. 10 is a transverse section through the rim shown in Fig. 9, illustrating the same mounted upon the felly of a wheel, the position of the section being indicated by the line X—X in Fig. 9.

Referring to the drawings in detail, the numeral 1 designates a vehicle wheel having a felly 2 which, if made of wood, is preferably provided with a metallic felly band 3 permanently secured thereon. This band is provided with suitable bearing surfaces upon which the tire-carrying rim is adapted to seat. These bearing surfaces are preferably of different diameters. As shown in the drawings, the felly band 3 has a raised flange 4 at one side thereof, the outer surface 5 of which forms an annular convex bearing surface. The other side of the rim is bent down as indicated at 6, its outer surface 7 forming a second annular convex bearing surface of less diameter than the convex annular bearing surface 5.

8 is the tire-carrying rim which, as shown in Figs. 1 to 6, inclusive, comprises a transversely split rim base or tire-seating portion 9 upon which seat the endless reversible tire-retaining flanges 10. The rim base is provided with flanges 11 preferably inwardly hooked as shown, which retain the endless flanges 10 in position. The flanges 10 are preferably provided with bases adapted to interlock beneath the inwardly hooked flanges 11. The rim base is provided with bearing surfaces 12 and 13 adapted to engage the bearing surfaces 5 and 7, respectively. The bearing surfaces 12 and 13 are most conveniently produced by rolling depressions in the rim base, one of the depressions being deeper than the other so as to make the bearing surface 13 of less diameter than the bearing surface 12. Means are provided for forcing the rim base away from the wheel at intervals so as to draw the bearing surfaces upon the former into close contact with the bearing surfaces upon the latter throughout the greater portion of the periphery of the wheel and thus secure a firm seating of the rim upon the wheel. For purposes of illustration I have shown such means as comprising radial studs 14 having conical ends 15 which are received in sockets 16 formed in the rim base, the studs having screw-threaded stems 17 which screw through threaded holes in plates 18. The plates 18 are secured to the under-surface of the felly in any suitable manner, preferably by means of rivets 19 passing through the plates, felly and felly band. The screw-threaded stems 17 have squared heads 20 by which the studs may be rotated. Lock-nuts 21 may be provided if desired. I preferably do not arrange these studs symmetrically throughout the entire circumference of the wheel, but provide at least one of the points where studs would be located, if the studs were symmetrically arranged, non-adjustable means for supporting the rim in the position in which it would be supported by a stud forced out against it. The rim when applied, and before the adjustable studs are screwed up, will be held slightly out of true by such means, but when the rim is forced out at other points by the studs it will be brought into a symmetrical position upon the wheel. In Fig. 1 I have shown the wheel provided with three studs located ninety degrees apart, the non-adjustable means to which I have referred being located at a point diametrically opposite to the intermediate stud.

In Figs. 2, 5 and 6 I have shown the non-adjustable means for supporting the rim formed as follows: The rim base of the tire-carrying rim is transversely split at 22, preferably obliquely both to a radius and to the edges of the rim. Secured to one end of the rim is a lug 23 having a central opening 24 therethrough, the lug being riveted to the rim base as shown in Fig. 2. The lug is provided with a flange 25 projecting from the same immediately beneath the under-surface of the rim base, this flange being adapted to seat upon the surface of the felly band 3 and thus to maintain the rim base spaced a fixed distance from the felly band. The lug preferably has an extension portion 26 which enters a hole 27 in the felly. 28 is the valve-stem of the tire 29 which passes through the hole 24 in the lug and the hole 27 in the felly. Secured to the other end of the rim base is a second lug 30 which is preferably similar in construction to the lug 23, except that it has no hole therethrough. This lug has the flange 31 resting upon the felly band and supporting the rim away from the felly band, and has an extension portion 32 preferably somewhat shorter than the extension 26 of the lug 23, this extension 32 passing through a hole in the felly band and being received in a socket 33 in the felly.

The operation of mounting the rim upon the wheel is as follows: Supposing the rim to have a tire mounted thereon with the valve-stem 28 passing through the hollow lug 23 and preferably secured thereto by means of a nut 34, the side of the rim provided with the lugs is first applied to the wheel, the valve-stem being slipped through its hole 27 and the lugs 23 and 30 entering the hole 27 and the socket 33, respectively. The other side of the rim is then swung into the plane of the wheel. The placing of a rim upon a wheel in this manner is commonly referred to as "button-holing". It will be seen that the rim is now loosely mounted upon the wheel, it occupying a slightly eccentric position thereon as it is lifted away from the periphery of the wheel at one side by the flanges 25 and 31 of the lugs. It will of course be understood that the studs 14 are retracted at this time. The studs 14 are now screwed out, the conical ends of the same entering the sockets in the rim base and accurately centering the rim upon the wheel. The further screwing out of the studs lifts the rim away from the wheel adjacent to the studs and causes the bearing surfaces of the rim to be drawn into close contact with the bearing surfaces of the wheel between adjacent studs and between the lugs 23 and 30 and the studs on each side thereof. The flanges 25 and 31 of the lugs are made of such thickness that when the studs are screwed out with sufficient force to cause the rim to clamp the wheel tightly, the rim will be supported at the same distance from the felly band by such flanges as it is supported away from the felly band by the studs. The rim is thus mounted concentrically upon the wheel. The slight distortion of the rim out of true circular shape by the operation of the studs is not sufficient to be noticeable or to interfere with the satisfactory operation of the wheel. It will be seen that the lugs and valve-stem and its associated parts and the three studs are disposed symmetrically about the wheel, so that a substantially balanced wheel is produced.

The studs 23 and 30 carried by the ends of the rim base and entering the sockets in the wheel serve to securely lock the ends of the rim base against displacement when the rim is mounted upon the wheel. Before the rim is mounted upon the wheel the ends of the rim base are held against displacement by the endless tire-retaining flanges 10, the bases of which hook beneath the inwardly turned flanges 11 of the rim base and thus prevent the collapsing of the rim base. The flanges 10, being forced laterally against the flanges 11 by the inflated tire, also prevent lateral displacement of the ends of the rim base. The flanges 10 will be maintained in contact with the flanges 11, even though the tire became deflated, by the clip 35 which holds the beads of the tire pressed against the flanges 10. The opening in the rim for the valve-stem 29 is preferably located near the split in the rim base, as has already been described, so that the clip 35 will be located near the split and thus act in the manner described. The valve-stem should also be near the inwardly projecting lugs on the rim so that the lugs and valve-stem may be "button-holed" into their respective openings in the wheel. It is also desirable to have the valve-stem near the split in the rim base, as the reinforced part of the inner tube of the tire which surrounds the valve-stem will thus extend over the split in the rim base, the extra strength of the tube at this point preventing injury thereto. Such reinforce is indicated at 36 in Fig. 2. In order to further protect the inner tube from injury by the edges of the split in the rim base, I preferably secure to the under-surface of one end of the rim base a plate 37. This plate passes between the ends of the rim base as indicated at 38, its extreme end, 39, overlapping the opposite end of the rim base from that to which it is secured. Such end of the rim base preferably has a shallow depression 40 formed therein to receive the end 39 of the plate, so that the tire-seating surface of the rim may be flush. The plate 37 need be made only of sufficient width to support the portion of the inner tube of the tire exposed between the toes of the tire casing. A notch 41 may be formed in one side of the rim base to permit a tool to be inserted between the rim base and one of the endless flanges 10. By inserting a tool in this manner the end of the rim case can be pried away from the flange and forced radially inward and then laterally, so that it may be grasped by the operator and collapsed, thus permitting the flanges 10 and the tire to be taken off. It is also often desirable to use a tool to pry the tire-carrying rim laterally from the wheel in case it is rusted thereon. For this purpose I preferably form a depression 42 in the edge of the felly band as shown in Figs. 1, 3 and 4. This makes it possible to insert the end of the tool between the felly band and the bearing surface 13 as shown in Fig. 3, by means of which the rim may be pried off.

In Figs. 7 and 8 I have shown a modification of my invention in which the lugs 23 and 30 are omitted. In place of these lugs a single lug 43 is provided upon one end of the rim base 44 near the split 45 therein. The lug 43 is preferably formed by depressing the metal of the rim base without thickening the same and has a central opening 46 therethrough for the valve-stem 47 of the tire. 48 is the valve-stem clip which is secured to the inner tube by means of a nut 49, this nut being conveniently received in the depression formed by the making of the lug 43. The valve-stem and clip are preferably secured in place by means of a nut 50 screwing against the under-side of the lug. The valve-stem is preferably located close to the split in the rim base, so that the reinforced portion 51 of the inner tube adjacent to the valve-stem will extend over the split. The felly band 52 has secured to it a plate 53 of sufficient thickness to support the rim above the felly band, just as the flanges 25 and 31 of the lugs 23 and 30 support the rim in the form of my invention previously described. The plate 53 has a hole 54 therein which receives the lug 43. The plate and lug thus prevent creeping of the rim upon the wheel. The lug 43 is preferably slightly tapered, the walls of the hole 54 being correspondingly tapered, so as to insure a tight fit between the lug and plate. The plate 53 may be secured to the felly band in any suitable manner; for example, by means of rivets 55 and 56, the rivets 56 being carried through the felly of the wheel and serving also to secure a plate 57 to the under-surface of the felly. The plate 57 has a threaded hole therein into which screws the end of the dust cap 58. The dust cap is thus supported entirely independently of the valve-stem and need not be removed when the rim and tire are taken off the wheel or replaced. The plate 53 is preferably extended beyond the split in the rim, as shown, and thus supports the ends of the rim in accurate alinement. The split 45 in the rim base is preferably oblique both to a radius and to the edges of the rim, but the inclination to the edges of the rim is preferably in the opposite direction to that of the split in the rim, having the lugs at each side of the split as above described. In the case of the rim having a lug at each side of the split, the two ends of the rim base are positively locked against lateral displacement by such lug when the rim is mounted upon the wheel.

With the form of my invention shown in Figs. 7 and 8, in which only one end of the rim base is provided with a lug, it is desirable to have such end of the rim base overlap so to speak, the other end of the rim base. Referring to Fig. 8, the side of the rim at the top of this figure is that toward the back of the wheel or the side nearest the body of the vehicle. This side of the wheel is provided with the raised flange 4 which will prevent lateral movement of either end of the rim base in that direction. The end of the rim base carrying the lug 43 is prevented from lateral movement in the opposite direction by reason of the engagement of such lug with the hole in the plate 53. Owing to the direction of the split in the rim base, this end of the rim base overlaps the opposite end of the rim base, as described, and thus prevents lateral movement of the other end of the rim base toward the front side of the wheel. It will thus be seen that when the rim is mounted upon the wheel both ends of the same are locked against lateral displacement.

In Figs. 9 and 10 I have shown a modified form of my invention in which the tire-carrying rim 60 has formed at one side thereof an integral tire-retaining flange 61, the other side of the rim being provided with a low flange 62 adapted to engage the endless tire-retaining flange 10. The rim, including the integral flange 61, is transversely split at 63, the plane of the split preferably being oblique both to a radius and to the edges of the rim. For preventing separation of the ends of the rim at the side of the latter opposite to that carrying the endless tire-retaining flange, I preferably provide suitable locking means which, as shown, comprise a plate 64 secured to one end of the rim, preferably upon the outside of the integral flange 61 thereof, this plate overlapping a portion of the other end of the rim and having one or more holes 65 therein which receive pins 66 projecting from the other end of the rim. When the ends of the rim are brought into alinement these pins enter the holes in the locking piece 64 and prevent circumferential separation of the ends of the rim. By moving the end of the rim carrying the locking piece 64 laterally, however, as shown in dotted lines in Fig. 9, the ends of the rim may be disengaged and the rim collapsed sufficiently to permit the endless flange 10 and the tire to be removed. The rim shown in these figures may be secured to the vehicle wheel in any suitable manner; for example, by the means shown in Figs. 1 to 6 and already fully described. For this purpose the ends of the rim are provided with the lugs 23 and 30. One end of the rim is also preferably provided with a plate 37 of the form described. The rim may also have a notch 41 formed therein for the reception of a tool. The depression 40 for the end of the plate 37 in the form of rim shown in these figures must be so shaped as to permit the ends of the rim to be moved laterally without any initial depression of the end of the rim, as the locking piece 64 and the pins 66 will not permit of such depression. For this reason the end 67 of the depression 40 is made at right angles to a circumference, so as to clear the corner of the plate 37. This is unnecessary in the form of rim shown in Figs. 1 to 6, as in that form of rim the end of the rim base in which the depression 40 is formed may be depressed sufficiently to free the end of the plate 37 before being forced laterally. Fig. 10 shows a form of felly band adapted to receive the rim 60. In this figure 68 is the felly band having the downwardly turned edge 69, the outer surface of which is adapted to form a convex bearing surface to be engaged by the bearing surface of the rim of smaller diameter. At the other edge the felly band carries a raised flange 70 which engages directly with the under-surface of the rim.

Having thus described certain preferred embodiments of my invention, but without desiring to limit myself thereto any further than as specified in certain of the more limited claims hereunto appended, I claim:

1. The combination with a vehicle wheel having a seat on its periphery, of a tire-carrying rim adapted to be removably mounted upon said seat, non-adjustable means interposed between the periphery of the wheel and fixed to said rim adapted to space said rim out of contact with said seat, and adjustable means for forcing said rim out of contact with said seat at another point in the circumference of the wheel to cause said rim to engage the seat on the wheel periphery between said non-adjustable means and said adjustable means.

2. The combination with a vehicle wheel having a seat on its periphery, of a tire-carrying rim adapted to be removably mounted upon said seat, a spacing device interposed between the rim and wheel fixed to and adapted to support said rim out of contact with said seat at one point in its circumference, and adjustable devices for forcing said rim out of contact with said seat at other points in its circumference, said spacing device and said adjustable devices being symmetrically located about the circumference of the wheel.

3. The combination with a vehicle wheel having a seat on its periphery, of a tire-carrying rim adapted to be removably mounted upon said seat, a spacing device inserted between said rim and the periphery of said wheel fixed to and adapted to support said rim out of contact with said seat at one point in its circumference, and a radially adjustable stud carried by the wheel at a point diametrically opposite said spacing device, said stud being adapted to force a portion of said rim out of contact with said seat.

4. The combination with a vehicle wheel, of a tire-carrying rim, and means for securing said rim upon said wheel comprising a fixed and non-adjustable device for supporting said rim upon said wheel at one point in the circumference thereof, said means holding said rim eccentric with relation to the wheel when the rim is applied thereto, and adjustable means for forcing said rim into a concentric position upon the wheel and clamping it thereto.

5. The combination with a vehicle wheel having a seat on its periphery, of a tire-carrying rim adapted to be removably mounted upon said seat, said rim having a projection on its under-surface adapted to engage the periphery of the wheel and to space said rim away from the seat on the wheel at one point in its circumference, and radially adjustable studs carried by said wheel at other points in its circumference adapted to engage the under-surface of said rim and force the same away from the seat on the rim adjacent to such points.

6. The combination with a vehicle wheel having annular seats of different diameters at the edges of its periphery, of a tire-carrying rim having annular seats of corresponding diameters adapted to engage the seats on the wheel periphery, a spacing device interposed between portions of the wheel periphery and the under-surface of the rim between said seats and adapted to support the portion of said rim adjacent thereto with its seats out of contact with the seats on the wheel periphery, and means located at another point in the circumference of the wheel for forcing said rim away from the wheel periphery and causing the seats on the rim to be drawn into engagement with the seats on the wheel periphery between said spacing device and forcing means.

7. The combination with a vehicle wheel having a seat on its periphery, of a tire-carrying rim adapted to be removably mounted upon said seat, said rim having a lug secured thereto provided with a flange extending beneath the under-surface of the rim and adapted to rest upon the periphery of the wheel and support portions of the rim adjacent thereto out of contact with the seat on the wheel periphery, and a plurality of radially adjustable, circumferentially spaced studs carried by the wheel adapted to force said rim out of contact with the seat on the wheel periphery at circumferentially spaced intervals.

8. The combination with a vehicle wheel having a seat on its periphery, of a tire-carrying rim adapted to be removably mounted upon said seat, said rim having a lug secured thereto provided with a flange extending beneath the under-surface of the rim and adapted to rest upon the periphery of the wheel and support portions of the rim adjacent thereto out of contact with the seat on the wheel periphery, said lug having a portion extending beyond said flange and received in a recess in the wheel periphery, and a plurality of radially adjustable circumferentially spaced studs carried by the wheel adapted to force said rim out of contact with the seat on the wheel periphery at circumferentially spaced intervals.

9. The combination with a vehicle wheel having a seat on its periphery, of a tire-carrying rim adapted to be removably mounted upon said seat, said rim having a lug secured thereto provided with a flange extending beneath the under-surface of the rim and adapted to rest upon the periphery of the wheel and support portions of the rim adjacent thereto out of contact with the seat on the wheel periphery, said lug being tubular and adapted to have the valve-stem of the tire passed therethrough and having a portion extending beyond said flange, said extended portion entering the hole through the wheel felly formed for the valve-stem, and a plurality of radially adjustable circumferentially spaced studs carried by the wheel adapted to force said rim out of contact with the seat on the wheel periphery at circumferentially spaced intervals.

10. In a vehicle wheel, in combination, a felly, a felly band thereon having a raised flange at one edge thereof forming an annular seat and having at the other edge thereof an annular seat of less diameter than the seat on said flange, a tire-carrying rim having annular seats on its under-surface adapted to engage the annular seats on said felly band, said rim having a projection on its under-surface between said annular seats adapted to engage a portion of the felly band between its annular seats and to support the adjacent portions of the seats on the rim out of contact with the seats on the felly band, and radially adjustable studs carried by the felly of the wheel and spaced circumferentially from each other and from said projection on the rim, said studs adapted to engage the under-surface of the rim and force the rim away from the felly band at intervals.

11. A vehicle wheel comprising a fixed rim provided with sockets in its periphery adapted to receive lugs, a demountable rim adapted to seat upon said periphery and provided with a plurality of circumferentially spaced lugs engaging said sockets and spacing said demountable rim from said fixed rim, and circumferentially spaced means for urging a portion of said demountable rim outwardly to cause said demountable rim to clamp said fixed rim.

12. A vehicle wheel comprising a fixed rim provided with sockets in its periphery, a demountable rim adapted to seat upon said fixed rim and provided with a plurality of lugs having flange members constituting bearing surfaces seating about the mouths of said sockets, and means for securing clamping contact between said rims comprising adjustable circumferentially spaced studs carried by said wheel and adapted to force the demountable rim out of contact with the fixed rim adjacent said studs.

13. The combination with a vehicle wheel having a seat on its periphery of a tire-carrying rim adapted to be removably mounted upon said seat, a non-adjustable spacing and locking device adapted to space and lock the rim upon said seat, and adjustable means for forcing said rim out of contact with said seat at another point in the circumference of the wheel.

14. The combination with a vehicle wheel having a seat on its periphery of a tire-carrying rim adapted to be removably mounted upon said seat, said wheel having a plurality of circumferentially spaced sockets therein, said rim being provided with a solid lug seating in one of said sockets, and a lug with a bore therethrough seated in the other of said sockets, said bore being adapted to receive a valve stem, said lugs spacing said tire-carrying rim away from said wheel, and means to cause said demountable rim to clamp said fixed rim comprising a plurality of circumferentially spaced rotatable studs projecting through said wheel and contacting with the under-side of said demountable rim.

JAMES H. WAGENHORST.

Witnesses:
SEWARD DAVIS,
EDMUND QUINCY MOSES.